Dec. 10, 1940.   F. G. BLUM, JR   2,224,589
RECORDING DEVICE
Filed Dec. 9, 1939

INVENTOR.
F. G. BLUM JR.
BY D. Clyde Jones
ATTORNEY.

Patented Dec. 10, 1940

2,224,589

UNITED STATES PATENT OFFICE 2,224,589

RECORDING DEVICE

Frederick G. Blum, Jr., Rochester, N. Y., assignor to Taylor Instrument Companies, Rochester, N. Y., a corporation of New York Application December 9, 1939, Serial No. 308,354

3 Claims. (Cl. 234—70)

This invention relates to recording devices.

In many installations where recorders are used, particularly in the pasteurization of milk, it has been found that certain operators tamper with the recorders to make a false record by manually rotating the recorder shaft after the recorder has indicated that the milk is at the desired temperature, so that it would appear that the milk has been maintained at the prescribed temperature for the legal period whereas, in fact, the milk was treated at this temperature for a much shorter period. Such falsification of the record necessarily entails opening the door of the recorder to gain access to the recorder chart.

The present invention therefore has as its main feature a simple, inexpensive arrangement for detecting such tampering action by making a permanent record on the recorder chart showing when the recorder door was opened and when it was closed. Thus if the door of the recorder is opened during the pasteurizing period, there will be a permanent record thereof and the operator will be subject to suspicion. In order to avoid this suspicion, the operator will not open the recorder door during the period in question and an honest pasteurizing record will result.

Another feature of the invention relates to the provision of a pen or stylus mounted on the door of a recorder to contact the recorder chart while the door is closed and during a portion of the door travel during the opening and closing operation.

Figures 1, 2:
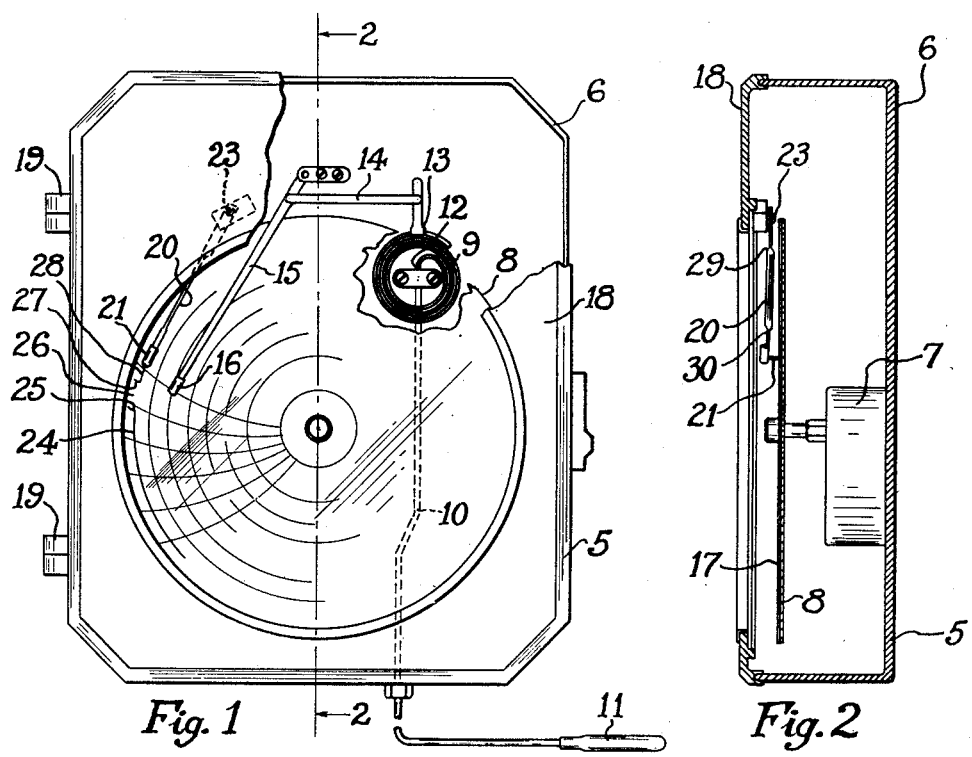
Figures 3, 5:
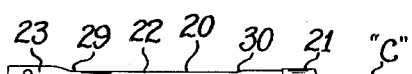
Figures 4, 6:
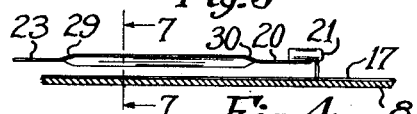
Figure 7:

These and other features of the invention will appear from the detailed description and claims when taken with the drawing in which Fig. 1 is a face view of a recording instrument in which the present invention has been incorporated, parts of the instrument case and chart table having been broken away to show certain details of the instrument; Fig. 2 is a vertical section taken on line 2—2 of Fig. 1, the temperature recording pen arm and its operating mechanism being omitted for the sake of clarity; Figs. 3 and 4 are top and side views respectively of the flexible stylus arm and stylus forming a principal feature of the present invention, and indicating the position of the arm and stylus when the instrument case door is slightly open; Figs. 5 and 6 are top and side views respectively of the flexible stylus arm and stylus showing their relation to the recorder chart when the door of the instrument case is completely closed; and Fig. 7 is a vertical section taken approximately on the line 7—7 of Fig. 4, illustrating the forces acting upon the intermediate portion of the flexible stylus arm while its stylus is in contact with the chart.

In the drawing, there has been shown a recorder generally indicated 5 which may be of conventional construction including an instrument casing 6 in which there is mounted a motor 7 for driving the chart table 8 at a predetermined rate. Since the recorder is herein illustrated as a temperature recorder, it is provided with a thermosensitive tube system comprising a Bourdon spring 9 which communicates through a capillary tube 10 with bulb 11 to be inserted in a medium, the temperature of which is to be recorded. This tube system may be filled with a liquid such as mercury or may be filled with a volatile liquid and its vapor. The Bourdon spring 9 has one of its ends 12 fixed to the instrument casing, the free end 13 of this spring being connected by suitable linkage 14 to a pivoted stylus arm 15. The free end of this arm is provided with a stylus 16 which in the present application of the invention records on the chart 17, the temperature at the bulb 11. The parts of the instrument which have been briefly described may be of any conventional construction, since the application of the present invention is not limited to a recording instrument of the character shown.

The front of the instrument casing is closed by means of a dust and fume proof door 18 hinged to the casing at 19. This door has one end of a stylus arm 20 fixed thereto. This arm is preferably made of flat, flexible material and is provided at its free end with a stylus 21 which engages the chart 17 when the door is closed. The portion 22 of the stylus arm 20 intermediate the fixed end 23 and the stylus 21 is inclined to the plane of the fixed end of this arm as shown particularly in Figs. 4 and 7, for a purpose to be hereinafter described.

It will be noted that the width of the stylus arm 20 is large in proportion to its thickness and is mounted on the door as a "cantilever beam" with the stylus 21 at its free end. A force, applied to the free end of the stylus arm, such as the contacting of the stylus with the chart, when the door is closed, will bend or flex this cantilever beam in the plane normal to the axis of least moment of inertia of the stylus arm cross-section, that is, the stylus arm will flex in the plane of its least resistance to bending. It will be understood from the description of the arm 20 that such a force applied to the stylus can be considered as transmitted to the inclined portion 22 of the stylus arm 20. This transmitted force acting on the portion 22 of the stylus arm is represented by the vertical arrow V in the force diagram illustrated in Fig. 7, while the horizontal component of this force acting on the inclined portion of the arm is represented by the arrow H in Fig. 7. It will be noted that the horizontal force component H tends to displace the arm 20 toward the right as viewed in Fig. 7, that is, toward the center of the chart (Fig. 1.)

Thus, when the stylus first engages the chart, as when the door is partially open it will be in the position shown in Figs. 3 and 4, the center line of the arm being indicated by the broken line "C". However, on increasing the force thereon as when the door of the instrument case is completely closed, the free end of the arm will be moved by the force component H to a new position shown in Fig. 5 where it will be seen that the free end of the arm has been moved away from the center line "C". The light lines immediately below the center lines "C" in Figs. 3 and 5 represent the normal position of one edge of the arm 20 to further emphasize the displacement of the arm.

Since the stylus arm 20 is fixed to the door, it will be held in the position shown in Figs. 5 and 6 when the door is closed. Thus when the door of the instrument case is closed and when the motor 7 is rotating the chart in the usual manner, the stylus 21 will be held in contact with the chart in the position shown in Figs. 1, 2, 5 and 6, and will trace an arc 24 (Fig. 1) concentric with the chart center. However, when the door is opened, the resilient stylus arm will tend to resume its normal position shown in Figs. 3 and 4, causing the stylus to move outwardly with respect to the center of the chart tracing a radial line 25 on the chart. As long as the door remains open a distance sufficient to remove the stylus from the chart, the stylus will not make a record on the chart. On closing the door, the stylus will trace a radial line 27 inward toward the center of the chart until the door is completely closed at which time it will continue to draw an additional arc or concentric line designated 28 (Fig. 1). Thus the gap between the lines 24 and 28 will indicate the period during which the door remained open.

While in the specific embodiment of the invention illustrated in the drawing, the arm 20 comprises a flat spring metal strip twisted at 29 and 30 to provide an intermediate inclined portion 22, it will be apparent that other constructions may be used.

While the invention has been disclosed in connection with a temperature recorder, it will be understood that the invention is equally applicable to a recorder adapted to record varying pressure, the level of a liquid in a receptacle, the rate of flow of a liquid and other similar condition recording devices.

I claim:

1. In combination, a recording device having a movable chart, means for moving said chart at a given rate, a door on said device to cover said chart, an arm of flat, flexible material, one end portion of said arm being fixed on the inner surface of said door with the flat surfaces of said end portion generally parallel to said door, a stylus mounted on the other end of said arm in a position to contact said chart when said door is closed, the portion of said arm intermediate said fixed end portion and said stylus being inclined with respect to said fixed end portion about the longitudinal axis of said arm.

2. In combination, a recording device having a rotatable disc-like chart, means for rotating said chart at a given rate, a door on said device to cover said chart, an elongated arm of flat, flexible material, said arm having one end fixed to the inner surface of said door and a stylus on the other end of said arm in a position to contact said chart when said door is closed, a portion of said flat arm being inclined with respect to the plane of said chart about the principal axis of said arm and being stressed by the pressure of said chart on said stylus when said door is closed whereby said stylus moves in a path substantially transverse to the longitudinal axis of said arm and in contact with said chart as said door is opened or closed.

3. In combination, a recording device having a rotatable disc-like chart, means for rotating said chart at a given rate, a door on said device to cover said chart, an elongated arm of flat flexible material, said arm having one end fixed to the inner surface of said door, and a stylus on the other end of said arm in a position to contact said chart when said door is closed, said arm extending over said chart at an angle to the radii of said chart which it crosses, a portion of said flat arm being inclined with respect to the plane of said chart about the principal axis of said arm and stressed by the pressure of said chart on said stylus when said door is closed whereby said stylus moves in a path substantially transverse to the longitudinal axis of said arm and in contact with said chart as said door is opened or closed.

FREDERICK G. BLUM, Jr.